United States Patent [19]

Vermande

[11] Patent Number: 4,509,857
[45] Date of Patent: Apr. 9, 1985

[54] IMAGING DEVICE, ESPECIALLY FOR PRODUCING IMAGES OF THE EARTH FROM A SATELLITE

[75] Inventor: Paul Vermande, Toulouse, France

[73] Assignee: Centre National d'Etudes Spatiales, Paris, France

[21] Appl. No.: 380,926

[22] Filed: May 21, 1982

[30] Foreign Application Priority Data

May 27, 1981 [FR] France ............................ 81 10545

[51] Int. Cl.³ .............................................. G01B 9/02
[52] U.S. Cl. .................................... 356/346; 356/351; 356/352
[58] Field of Search ............... 356/346, 351, 352, 363

[56] References Cited

U.S. PATENT DOCUMENTS 3,881,105  4/1975  De Lang et al. ............... 356/351 X

OTHER PUBLICATIONS

Block et al., "Inflight Satellite Measurements . . . ", Applied Optics, vol. 3, No. 2, pp. 209–214, Feb. 1964.
Meaburn, "Versatile Nebular Insect-Eye Fabry-Perot Spectrograph", Applied Optics, vol. 14, No. 2, pp. 465–469, Feb. 1975.
Chaux et al., "Diameter Measurements of Fabry-Perot . . . ", Optics Communications, vol. 30, No. 2, pp. 239–244, Aug. 1979.

Primary Examiner—Davis L. Willis
Assistant Examiner—Matthew W. Koren
Attorney, Agent, or Firm—Christie, Parker & Hale

[57] ABSTRACT

Device for observing a heavenly body from a space vehicle, especially for observing the earth from a satellite, comprising stationary optical means for providing an image of an observed elementary zone, said image having a light intensity, such that when said zone moves with respect to the vehicle, the said image moves and the said intensity varies, the intensity values of the image being representative of the interferogram of said zone.

20 Claims, 8 Drawing Figures

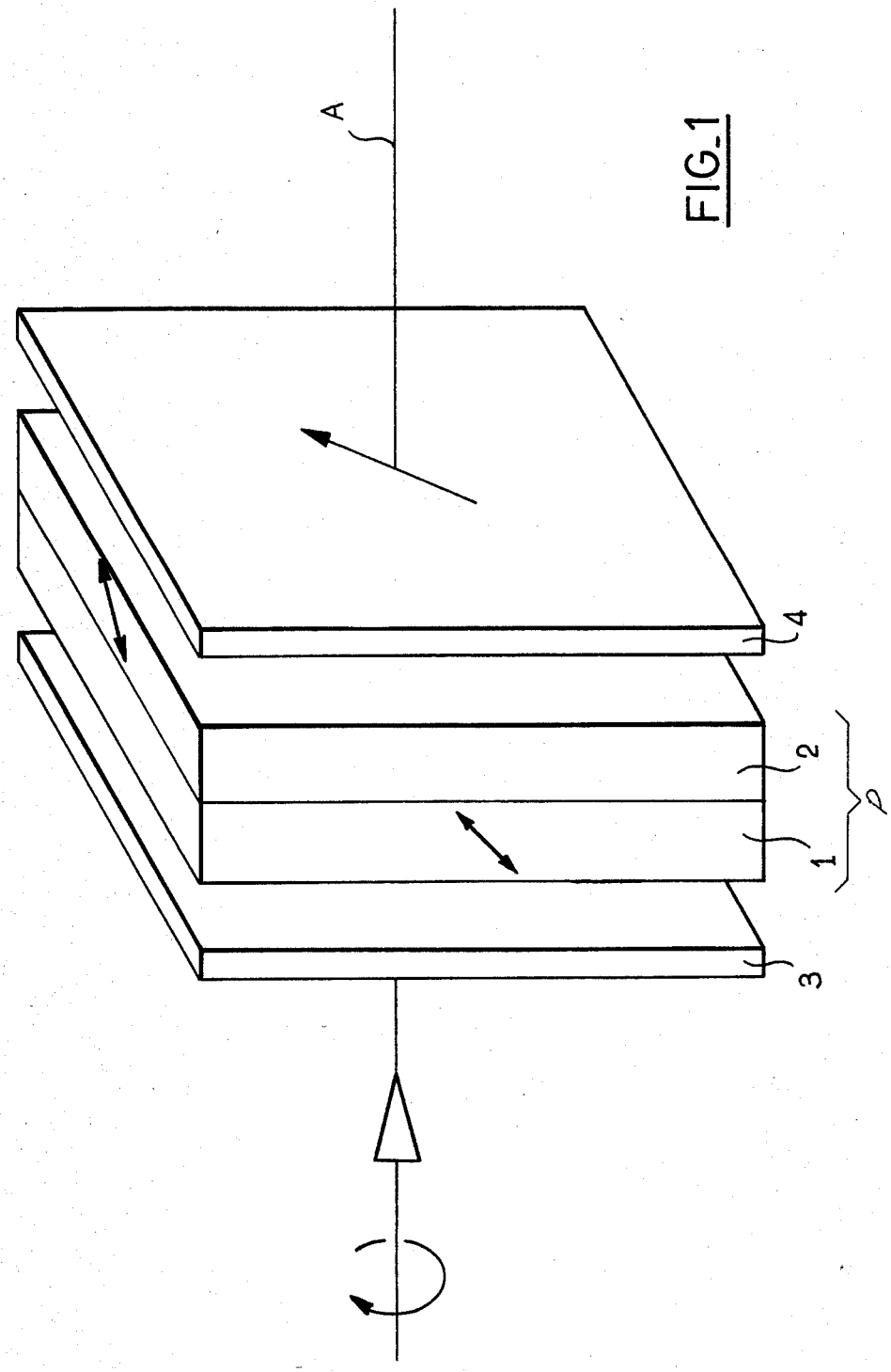
FIG_1

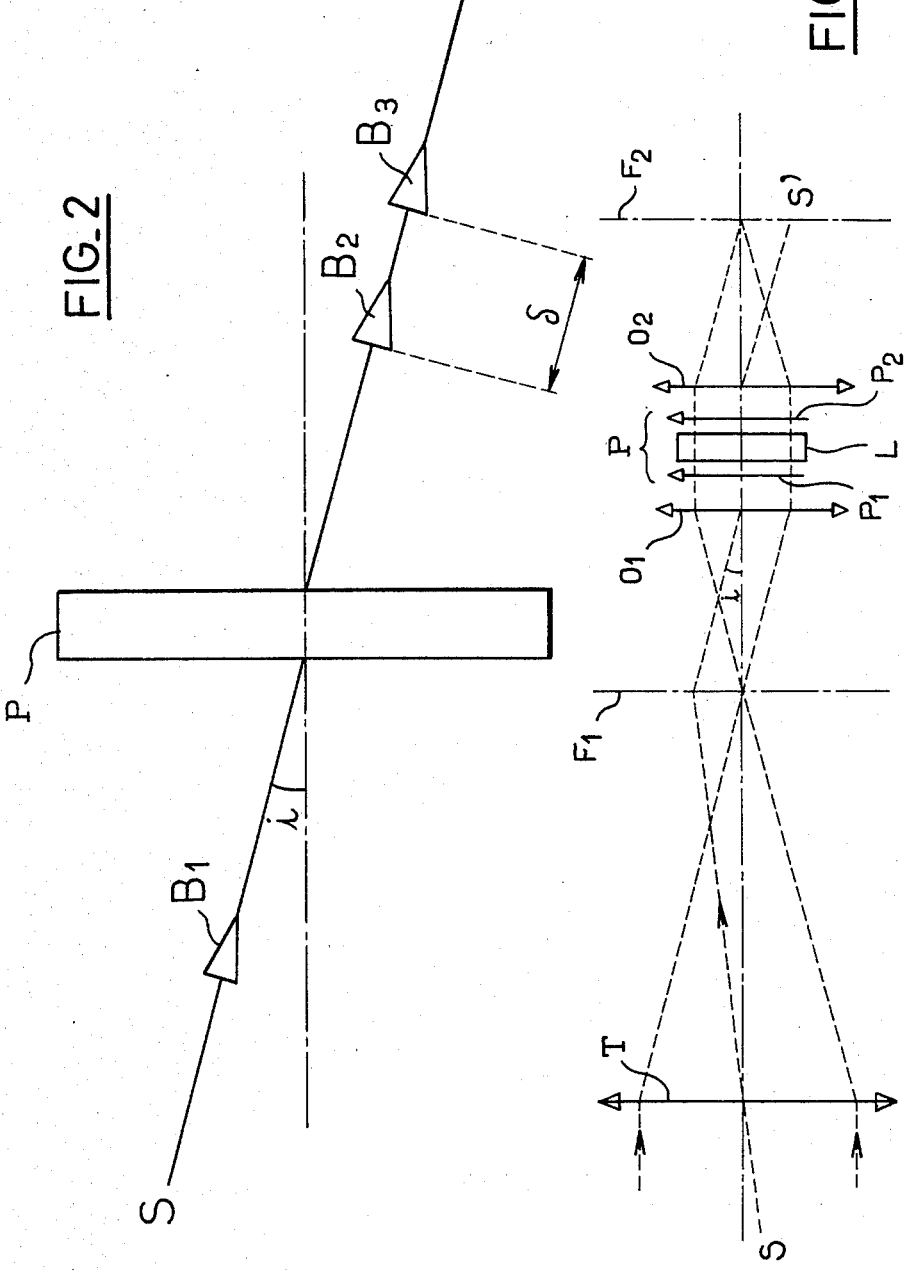

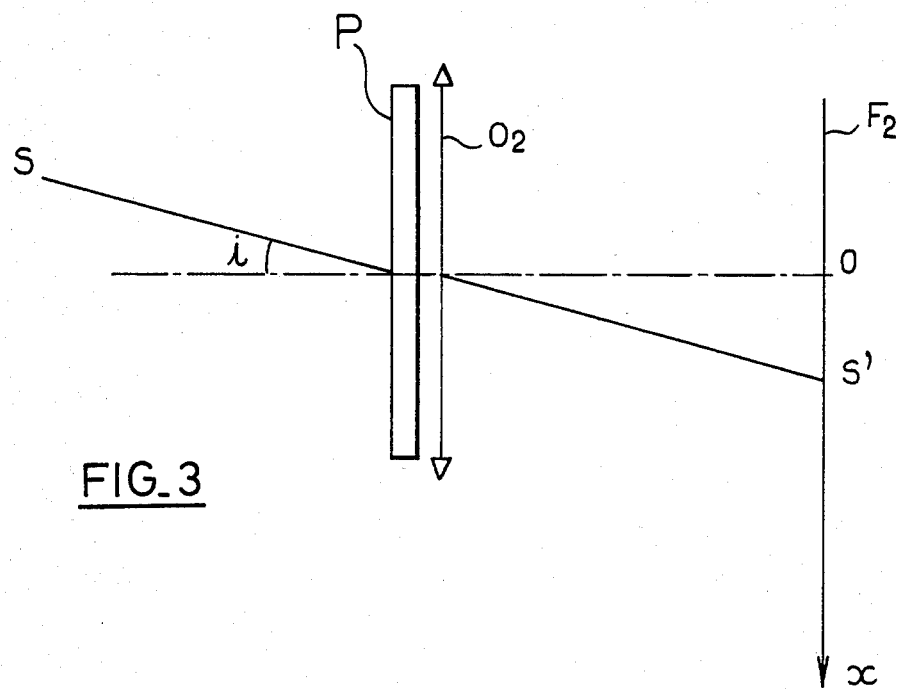
FIG_3
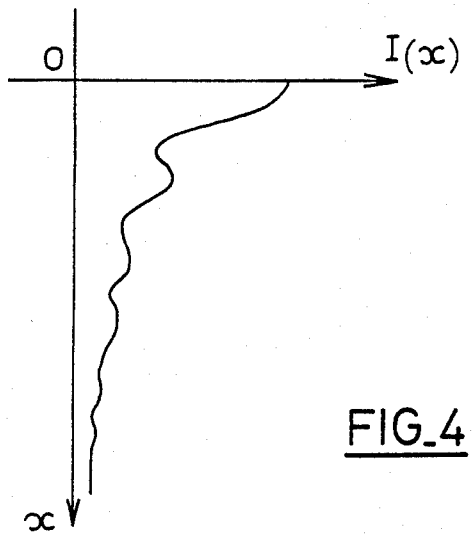
FIG_4

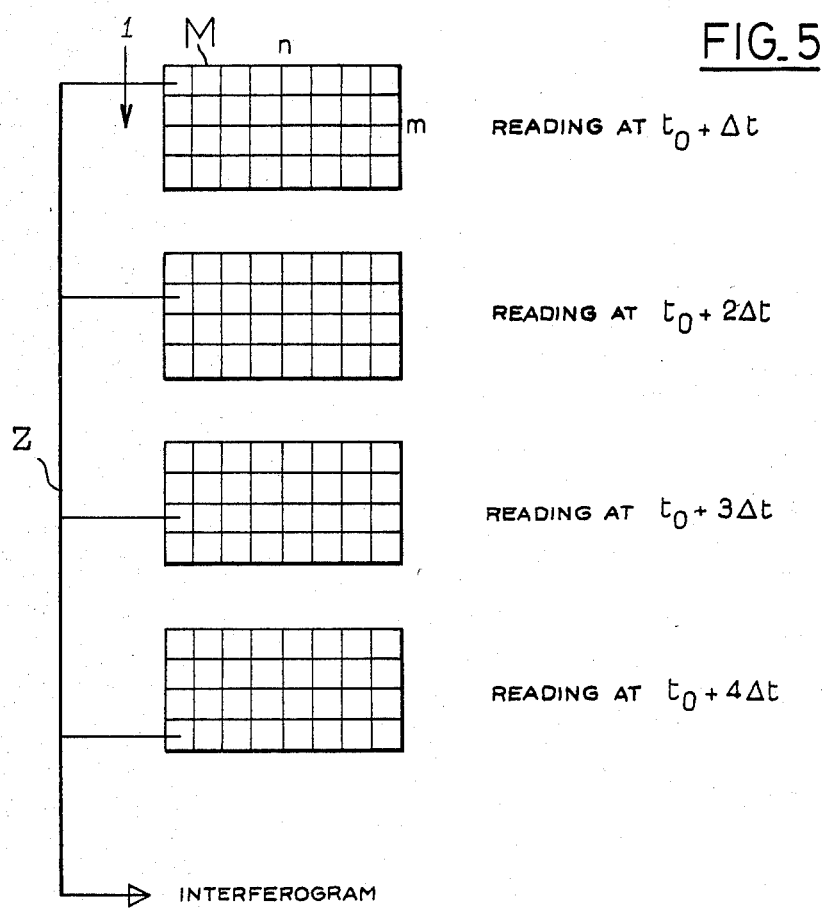
FIG_5
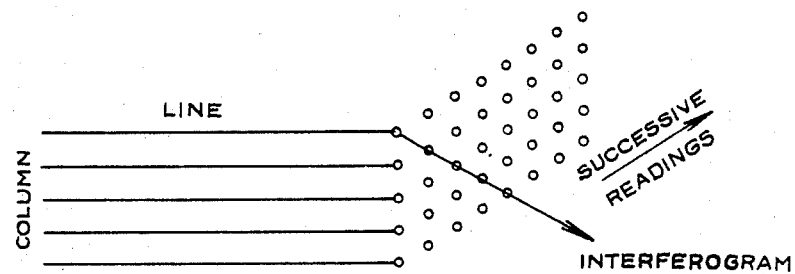
FIG_7

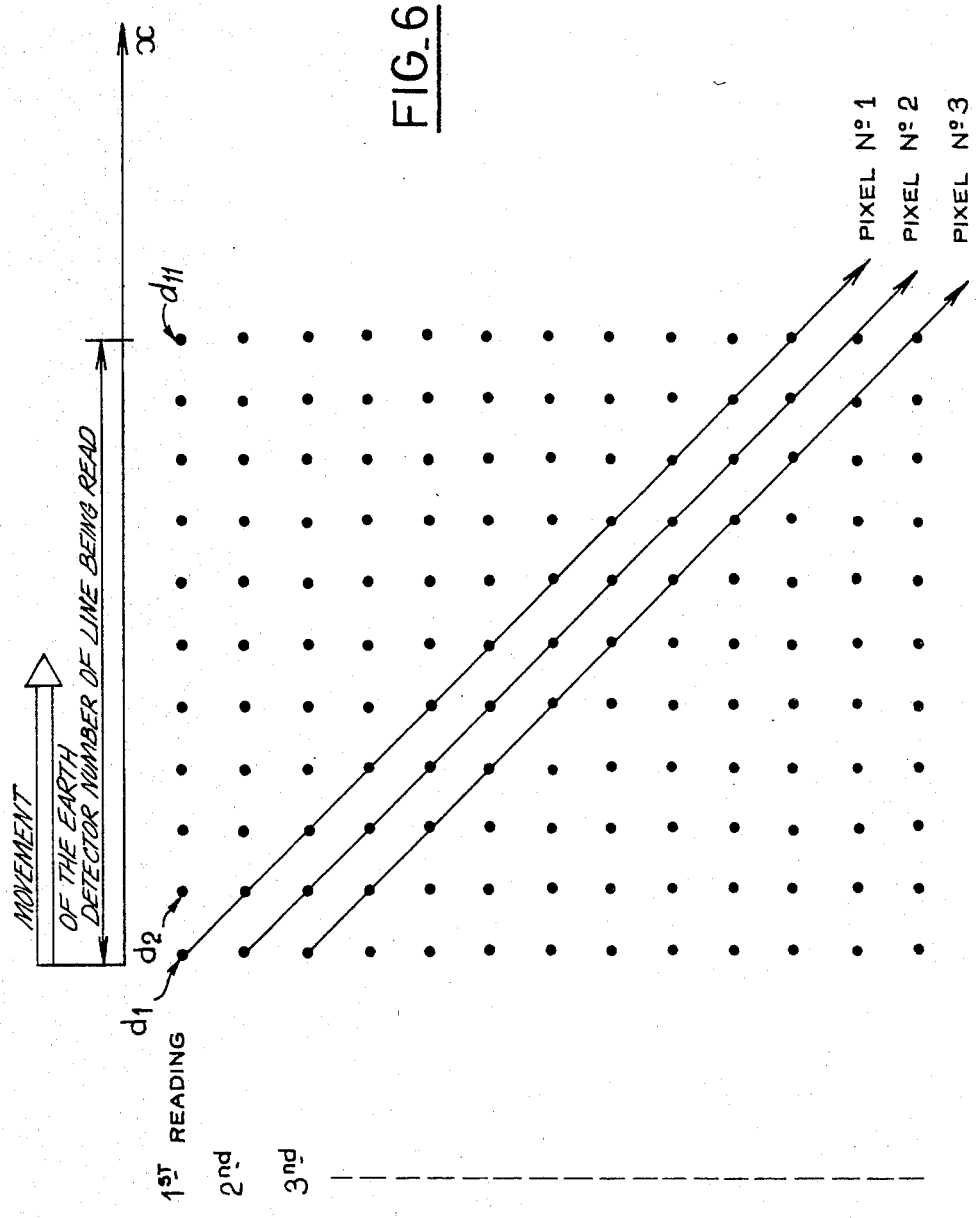

IMAGING DEVICE, ESPECIALLY FOR PRODUCING IMAGES OF THE EARTH FROM A SATELLITE

BACKGROUND OF THE INVENTION

The invention relates to a device for producing images of the earth or other heavenly body from a satellite or other space vehicle.

It is known to obtain spectral images of the Earth aboard a stabilized satellite by means of a dispersing system comprising a prism or a grating, or by means of filters or of dichroic blades.

U.S. Pat. No. 3,660,594 discloses a device comprising a plurality of prisms or gratings which spectrally disperse each of the image segments onto the photosensitive input surface of a suitable camera tube.

The resolution thus obtained is low and a group or a plurality of prisms must be used.

To avoid these drawbacks it has been proposed to use a single optical system, as disclosed in the U.S. Pat. No. 3,702,735.

This Patent discloses a device which essentially comprises a Michelson interferometer associated with an array of photodetectors. Means are provided for reciprocating one of the mirrors of the interferometer in order that each individual photodetector receives an interferogram signal which is functionally related to the spectrogram of light from the scene. The signals provided by the photodetectors are transfered to a computer wherein the signals are processed in a Fourier transform unit to provide the spectrogram.

The resolution is improved but it is very difficult aboard a space vehicle to control precisely the movement of the mirror of the Michelson interferometer.

SUMMARY OF THE INVENTION

Accordingly, it is an object of the invention to provide a device for obtaining the interferogram or the spectrogram of each elementary zone of the Earth viewed from a satellite, by means of a single optical device without moving an optical piece thereof.

Another object of the invention is to provide a device for processing the interferograms in real time in order to obtain the spectra of the viewed zones.

A further object of the invention is to provide a device having a very high spectral resolution, i.e., a resolution of some nanometers, whereas the resolution of the known devices is some ten nanometers.

Typically a device according to the invention is useful for obtaining spectral images of the oceans, especially for investigating phytoplancton. In this use, the invention allows detection of a dozen different spectral bands, each band having a width of about ten nanometers.

The device of the invention comprises static or stationary optical means aboard the space vehicle for producing an image of an observed elementary zone of the heavenly body. When the zone moves with respect to the vehicle, its image moves and the light intensity of the image varies according to the interferogram of such zone. The space vehicle preferably is a non-stationary satellite or a dirigible balloon.

Preferably the optics means aboard the space vehicle comprises fixed interferometric means producing fringes localized at infinity.

In a typical embodiment, the device comprises interferometer means for receiving an incident light beam from the observed elementary zone, splitting this beam into at least two beams having a difference in the lengths of their optical paths depending on the angle of incidence and interfering said two beams at an image plane.

The fringes thus produced are linear or circular depending on the optical means.

Preferably, detectors are spread over the path or image plane where the image moves when the observed zone moves with respect to the space vehicle and each detector provides an output signal which is representative of the light intensity of the image received on the detector.

For observing several elementary zones simultaneously with the same optical device, several lines of detectors are used, each detector providing an output signal representative of the light intensity of the image of a definite elementary zone observed according a definite angle of incidence.

A series of detectors suitably selected provides a series of signals which are representative of the variations in intensity of the image of the same elementary zone when the angle of incidence varies, and consequently are representative of the interferogram of this zone. By Fourier transform it is possible as known to calculate the spectrum of this zone from the interferogram.

The same operations may be made simultaneously for all the elementary zones which are observed simultaneously.

The gist of the invention is using the movement of the observed source for obtaining the interferogram instead of moving an optical means in the optical device.

In the device according to the U.S. Pat No. 3,702,735, it is necessary to move a mirror for varying the difference in the length of optical paths and the spectral resolution of the interferometer depends upon the distance over which the moving mirror moves. In a device according to the invention, the variation of said difference, and consequently the interferogram, is obtained by the movement of the observed source with respect of the optical device.

BRIEF DESCRIPTION OF THE DRAWINGS

Reference to the drawings will further explain the invention.

FIG. 1 is a schematic view of interferometric means used in an embodiment of a device according to the invention;

FIG. 2 is a schematic view of the interferometric means illustrating the function of the interferometric means.

FIG. 3 is a schematic view of the interferometric means and showing an image plane for receiving an interference pattern;

FIG. 4 is a graphic representation of a portion of an interferogram of a source observed through the device of FIG. 3;

FIG. 5 is a schematic view of mosaic array of detectors used in a device according to the invention;

FIG. 6 is a schematic view of a mode of reading information provided by one line of detectors disposed along a line parallel to the direction of movement of the observed source;

FIG. 7 is a similar view in the case of a mosaic array of detectors, and

FIG. 8 is a schematic view of an observation device comprising an interferometric device as illustrated in FIG. 1.

DESCRIPTION OF THE PREFERRED EMBODIMENT

The device to be placed aboard a non-stationary satellite comprises an interferometric system producing at least two waves for interference to thereby produce fringes localized at infinity.

In the embodiment shown in FIG. 1, this system is a SAVART polariscope P comprising two plates 1,2 in uniaxial medium, such as in calcite, cut at 45° to the optical axis and rotated 90° with respect to one another, said two plates being located between two parallel or crossed polarizers 3,4.

Such polariscope may be one such as is disclosed in the Professor FRANCON's publication "ISOTROPIC AND ANISOTROPIC MEDIA. APPLICATION OF ANISOTROPIC MATERIALS OF INTERFEROMETRY", include in ADVANCED OPTICAL TECHNIQUES (Ed. AC.S. Van Heel-North-Holland, Published Co, Amsterdam).

A wave $B_1$ (FIG. 2) coming from an observed zone S at infinity under an angle of incidence i is split by the polariscope into two waves $B_2$, $B_3$ having a path difference $\delta$:

$$\delta = d \sin i$$

where $d = 0.106 \, e$ when said uniaxial medium is calcite, e being the width of the plate. Other means P for splitting a wave or beam may also include a Fabry-Perot interferometer, as disclosed in Born and Wolf, Principles of Optics, Electromagnetic Theory of Propagation, Interference and Diffraction of Light, (5th ed., 1975, Pergamon Press), p. 329 et seq.

The two waves meet at S' (FIG. 3), the image of S, after traversing a lense or objective $O_2$ placed downstream from the polariscope. There is interference at S' and the fringes are localized at infinity, i.e. in the image or focal plane $F_2$ of the lens or objective $O_2$.

The intensity $I_{(x)}$ of the image S' is $$I_{(x)} = 1 + \cos (2\pi^{67}/\lambda)$$

When S is polychromatic, $I_{(x)}$ is the interferogram of $S_{(\lambda)}$.

By placing a series of detectors according to Ox, it is possible to measure and record $I_{(x)}$ as a function of x when S moves (FIG. 4).

Detectors in the form of charge-coupled (CCD) devices are preferable. Such detectors are well-known and have been used in inteferometric devices, as disclosed in the publication "The Use of Charge-Coupled Devices for Automatic Processing of Interferograms" (Journal of Optics, vol. 12, No. 2 Paris, France).

A mosaic M of detectors put in the focal plane $F_2$ allows simultaneous observation of a plurality of elementary zones, each detector in a line providing at a given time an output signal representative of the intensity of the image of one elementary zone seen according to one angle of incidence. The outputs signals may be processed immediately or stored for later processing.

One elementary zone or "pixel" is a square of $10 \times 10$ $m^2$ (high resolution) or otherwise maybe $500 \times 500$ to $1000 \times 1000$ $m^2$.

Preferably, the mosaic comprises (FIG. 5) n lines of m detectors, the lines being perpendicular to the fringes and parallel to the direction of movement, as shown by the arrow labeled 1 in FIG. 5, of the observed zones with respect to the space vehicle. When the elementary zone is square, only one line, for example, the first line, of the mosaic M of detectors need be used. However, in the case of a rectangular elementary zone, where the long side extends along a line perpendicular to the direction of relative motion of the observed zone and to the line of detectors, additional lines of detectors, the second, third, etc., are used to observe the larger zone.

All the outputs of the detectors of one line are read or transferred simultaneously to a processing device and two successive transfers (or readings) are separated by an interval of time $\Delta t = a/v$ where "a" is the dimension of the observed zone (i.e. a square area ) and "v" is the relative velocity between the zone and the space vehicle.

For obtaining the interferogram of the zone, the image of which was on the first detector of the first vertical line at $t_0 + \Delta t$, the output of said detector is read at $t_0 + \Delta t$, the output of the second detector of the same vertical line of detectors is read at $t_0 + 2\Delta t$, the output of the third detector of the same vertical line of detectors is read at $t_0 + 3\Delta t$, and so on (FIG. 5). The output, 2, of FIG. 5 gives an interferogram of elementary zone or pixel number one, the image of which is on one or more lines n of detectors, obtained by successive readings at time $t_0 + \Delta t$ through $t_0 + 4\Delta t$.

For obtaining the interferogram of the adjacent zone in the direction of movement, the output of said first detector is read at $t_0 + 2\Delta t$, the output of said second detector is read at $t_0 + 3\Delta t$, the output of said third detector is read at $t_0 + 4\Delta t$, and so on.

FIG. 6 shows successive readings of all the detectors of a given vertical line of detectors of FIG. 5. On this drawing, the points of a horizontal line represent simultaneous readings of the detectors of a given line of detectors $d_1$, $d_2$ . . . $d_{11}$, which would be parallel to the direction of motion of the observed zone. Sucessive horizontal lines represent successive readings for the same line of detectors. A given vertical array of points represents chronologically successive readings of a given detector in the line of detectors. For obtaining the interferogram of zone number 1, readings from the given line of detectors are taken-up according to the diagonal line starting from $d_1$ at time $t_0 + \Delta t$, from $d_2$ at $t_0 + 2\Delta t$, etc. Furthermore, at time $t_0 + 2\Delta t$, the second elementary zone, or pixel number 2, will have come into view for reading by detector $d_1$. At the same time, readings will be taken by detector $d_2$ from the first elementary zone, pixel number 1, at the new angle of incidence.

Similarly FIG. 7 shows sequential readings in the case of a plurality of parallel lines of detectors that is a mosaic of detectors.

Other reading processings are possible of course. Thus it is possible to read only the output of one detector of two successive detectors.

When a spectrogram is desired, the interferogram is processed by a Fourier transform as known (see, for example the publication Spectroscopie Instrumentale of Professor Bousquet - Edition Dunod Paris, 1969).

A device according to the invention works as a spectrometer with respect to an observed zone since it provides, in an image plane, intensity values which are interferogram values. But since the device provides in real time the interferograms of all the zones observed simultaneously, such device provides an image as a spectrograph.

Usually the device also comprises a telescope T (FIG. 8) which provides an image of the earth in a plane $F_1$ and an objective $O_1$ the object focal plane of which is $F_1$.

Of course, the device also comprises electronic means for processing the outputs of the detectors as required. It is not necessary to describe such means which are not the invention. Additionally, electronic means may be shared between the space vehicle and a station at earth.

It is emphasized that the invention is not limited to the use of a SAVART polariscope. Thus an interferometer FABRY-PEROT may be used as well, especially when circular fringes are preferred. The invention is not limited to the use of CCD, as other detectors may be used.

Further modifications and alternative embodiments will be apparent to those skilled in the art in view of this description and, accordingly, the foregoing specification is considered to be illustrative only.

What is claimed is:

1. An apparatus for producing signals processable to obtain an interferogram of a zone of a heavenly body comprising:

a space vehicle for movement relative to the zone in a given direction;

optical means comprising fixed interferometric means statically located on the space vehicle while receiving light from such zone and while providing, in a plane, successive images of said zone as a result of such movement wherein the interferometric means comprises means for receiving the light and interfering portions of the light from the zone for producing each image as a function of phase differences in the light; and a plurality of detectors mounted on the space vehicle coplanar with such plane and arranged in a line for successively detecting, at different times, the light intensity of each image of the successive images, each detector being adapted for providing an output signal representative of the light intensity of the image detected by such detector, the signals from all such detectors for a given zone being the signals processable to obtain the interferogram.

2. An apparatus according to claim 1, wherein the plurality of detectors comprises groups of detectors wherein each group is arranged in one of a plurality of lines, where each of said lines is parallel with the first named line.

3. An apparatus according to claim 1, wherein said line is parallel to such given direction.

4. A apparatus according to claim 2, wherein said plurality of detectors is placed in said plane according to a mosaic array having lines of detectors oriented parallel to said direction.

5. An apparatus according to either of claims 1 or 4, wherein said interferometric means is adapted for receiving an incident light beam from said zone for splitting the beam into at least two beams having a difference in lengths of their optical paths dependent on the angle of incidence and for interfering said two beams at the image plane.

6. An apparatus according to either of claims 1 or 4, wherein said interferometric means comprises a Savart polariscope.

7. An apparatus according to claim 6, wherein said Savart polariscope comprises two plates of a uniaxial medium, each cut with an optic axis at 45° to an axis normal to the plate and rotated at 90° relative to one another, said two plates being located between two polarizers.

8. An apparatus according to either of claims 1 or 4, wherein said interferometric means comprises a Fabry-Perot interferometer.

9. The apparatus as claimed in claim 1 wherein the space vehicle satellite moves relative to Earth.

10. The apparatus as claimed in claim 9 wherein the heavenly body comprises Earth such that the interferogram obtained comprises an interferogram of a zone of Earth.

11. A method for producing output signals processable to form an interferogram from light waves from a zone on a heavenly body, using optical means having interferometric means for producing an image at an image plane for detection by detectors, the method comprising the steps of:

placing the interferometric means and the detectors aboard a space vehicle, wherein there is relative movement in a direction between the space vehicle and heavenly body;

enabling the interferometric means to receive the light waves from the zone and to produce a sequence of images at the image plane due to the relative movement while maintaining the interferometric means fixed relative to the optical means and the space vehicle wherein each image is produced by interfering the light waves from the zone as a function of phase differences in the light waves; and arranging the detectors at the image plane parallel to the direction to detect the successive images and to produce the output signals representing the intensity of the interfered light waves for the successive images for a given zone processable to form the interferogram.

12. The method according to claim 11, wherein the step of placing the interferometric means comprises the step of placing aboard the space vehicle two light polarizers maintained static relative to the image plane while the succession of images is detected by the detectors at different times.

13. The method according to claim 11, wherein the step of arranging comprises the further step of arranging the detectors such that a plurality of detectors are arranged in a plurality of lines each containing at least two detectors, and wherein each of said lines is parallel with the direction.

14. The method according to claim 13, wherein the further step of arranging comprises the step of placing the plurality of detectors in the image plane according to a mosaic array having lines of detectors oriented parallel to said direction.

15. The method of either of claims 11 or 14, wherein the step of enabling comprises the step of adapting the interferometric means for receiving an incident light beam from said zone for splitting the beam into at least two beams having a difference in lengths of their optical paths dependent on an angle of incidence of the beam and for interfering said two beams at the image plane.

16. The method according to either of claims 11 or 13, wherein the step of placing the interferometric means comprises the step of placing a Savart polariscope aboard the space vehicle.

17. The method according to claim 16, wherein the step of placing a Savart polariscope further comprises the step of placing two plates of a uniaxial medium, each plate cut with an optic axis at 45° to an axis normal to the plate and rotated at 90° relative to one another, aboard the space vehicle between two polarizers.

18. The method according to either of claims 11 or 14, wherein the step of placing the interferometric means comprises the step of placing a Fabry-Perot interferometer aboard the space vehicle.

19. The method according to claim 11 wherein the step of placing comprises the step of placing the interferometric means and the detectors aboard a satellite moving relative to Earth.

20. The method of claim 19 wherein the step of enabling comprises the step of enabling the interferometric means to receive the light waves from a zone on Earth.

* * * * *

UNITED STATES PATENT AND TRADEMARK OFFICE
CERTIFICATE OF CORRECTION

PATENT NO. : 4,509,857

DATED : Apr. 9, 1985

INVENTOR(S) : Paul Vermande

It is certified that error appears in the above-identified patent and that said Letters Patent is hereby corrected as shown below:

Column 3, line 21, "include" should read -- included --.
Column 3, line 44, that portion of the formula reading
"$(2\pi^{67}/\lambda)$" should read -- $(2\pi\delta/\lambda)$ --.

$$\text{Signed and Sealed this}$$

$$\text{Twenty-second Day of October 1985}$$

[SEAL]

*Attest:*

*Attesting Officer*

DONALD J. QUIGG

*Commissioner of Patents and Trademarks—Designate*